US006428049B1

United States Patent
Nichols

(10) Patent No.: US 6,428,049 B1
(45) Date of Patent: Aug. 6, 2002

(54) SEAT BELT RELEASE MECHANISM

(76) Inventor: John H. Nichols, 1305 Ava La., Arnold, MO (US) 63010

( * ) Notice: Subject to any disclaimer, the term of this patent is extended or adjusted under 35 U.S.C. 154(b) by 0 days.

(21) Appl. No.: 09/746,293

(22) Filed: Dec. 21, 2000

Related U.S. Application Data

(60) Provisional application No. 60/172,645, filed on Dec. 26, 1999.

(51) Int. Cl.$^7$ .............................................. B60R 22/00
(52) U.S. Cl. ..................... 280/801.1; 280/802; 297/468
(58) Field of Search ............................. 280/801.1, 802; 297/468, 469, 485; 180/268, 269, 270, 271

(56) References Cited

U.S. PATENT DOCUMENTS

| | | | | |
|---|---|---|---|---|
| 3,168,158 A | * | 2/1965 | Schoeffler | 180/82 |
| 3,177,966 A | * | 4/1965 | Schoeffler | 180/82 |
| 3,351,381 A | * | 11/1967 | Boblitz | 297/385 |
| 3,362,748 A | * | 1/1968 | Carter | 297/385 |
| 4,049,293 A | * | 9/1977 | Bouju | 280/744 |
| 4,162,715 A | * | 7/1979 | Coulombe | 280/801 |
| 4,574,911 A | * | 3/1986 | North | 180/270 |
| 4,773,693 A | * | 9/1988 | Premji et al. | 296/65.1 |
| 4,993,746 A | * | 2/1991 | Hagelthorn | 280/806 |
| 5,165,498 A | * | 11/1992 | Garboli et al. | 180/268 |
| 5,765,660 A | * | 6/1998 | Ambrosi | 180/268 |

FOREIGN PATENT DOCUMENTS

| JP | 405112198 A | * | 10/1993 | 280/802 |
|---|---|---|---|---|
| JP | 10194085 A | * | 7/1998 | B60R/0/22 |

* cited by examiner

*Primary Examiner*—Lanna Mai
*Assistant Examiner*—Kelly E Campbell
(74) *Attorney, Agent, or Firm*—Paul M. Denk

(57) ABSTRACT

A seat belt release mechanism for use in conjunction with vehicle seats, such as upon a bus, and the like, including a sleeve fixed to the approximate rear of each vehicle seat, a tube provided therein, the tube cooperating with the sleeve to lock the back ends of the seat belts into position fixing them for securement of the seat occupants in place, during routine usage. Each tube extends a distance outwardly from its respective sleeve, and is provided with a lever, attaching with a drive mechanism, whether it be a cable or rod, such that when the drive mechanism is shifted, either manually by a winch, or automatically by a motor mechanism, the back ends of the seat belts may be locked into position for routine usage, or immediately released, for allowing the occupants to be freed from their securement within the vehicle seats in the event that an emergency is encountered.

12 Claims, 5 Drawing Sheets

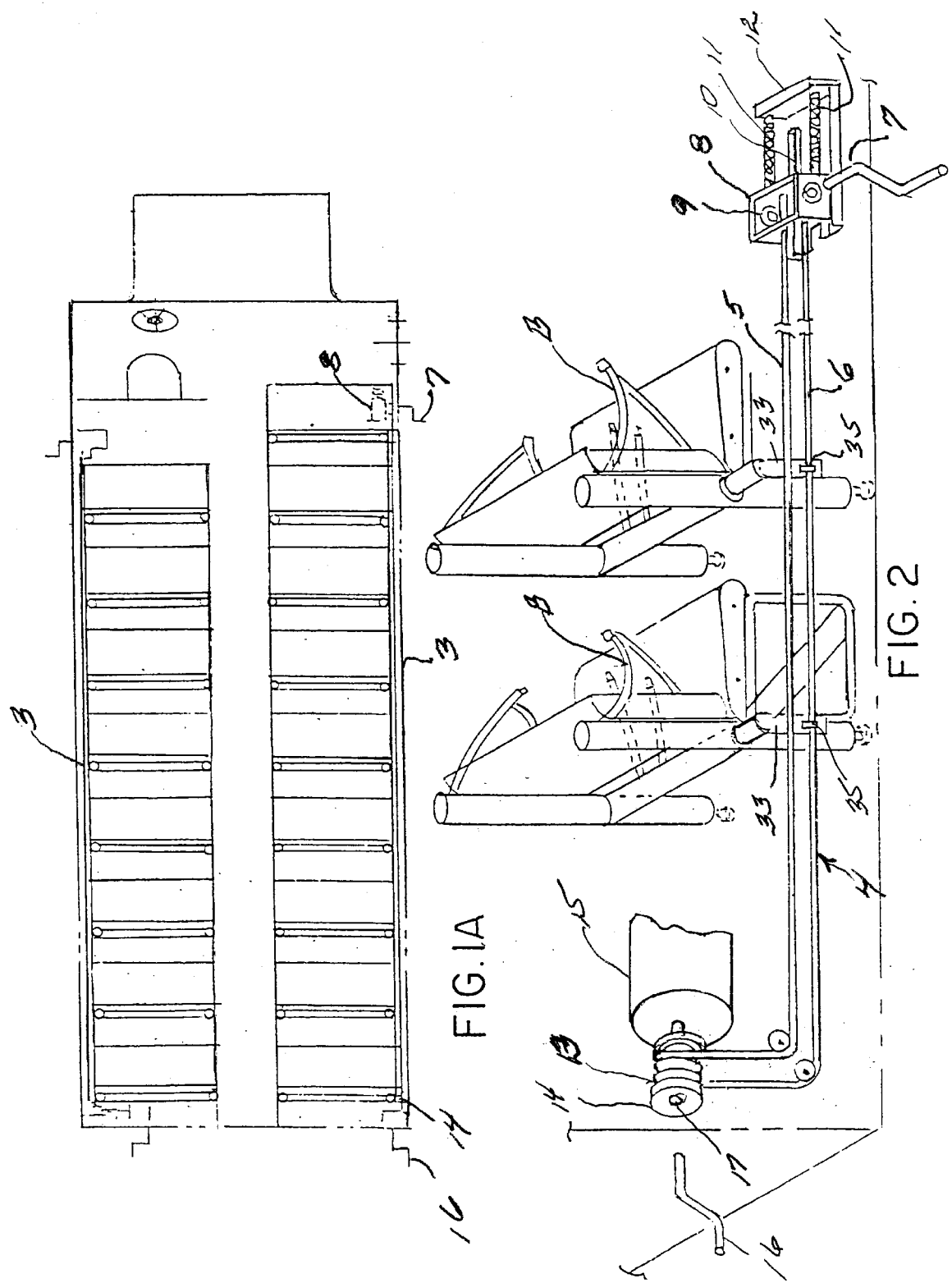

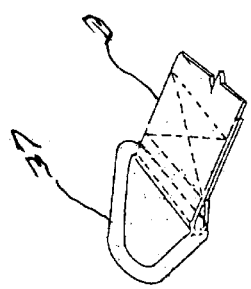
FIG. 6
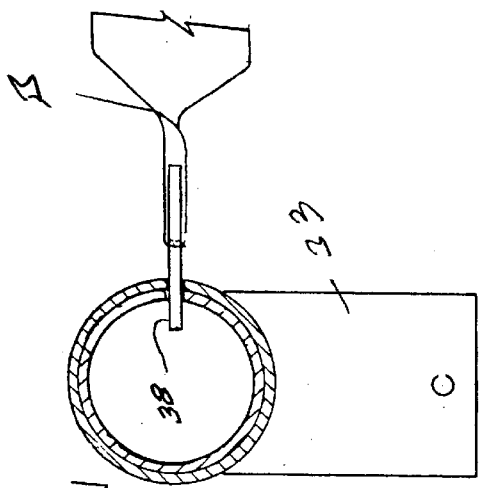
FIG. 4
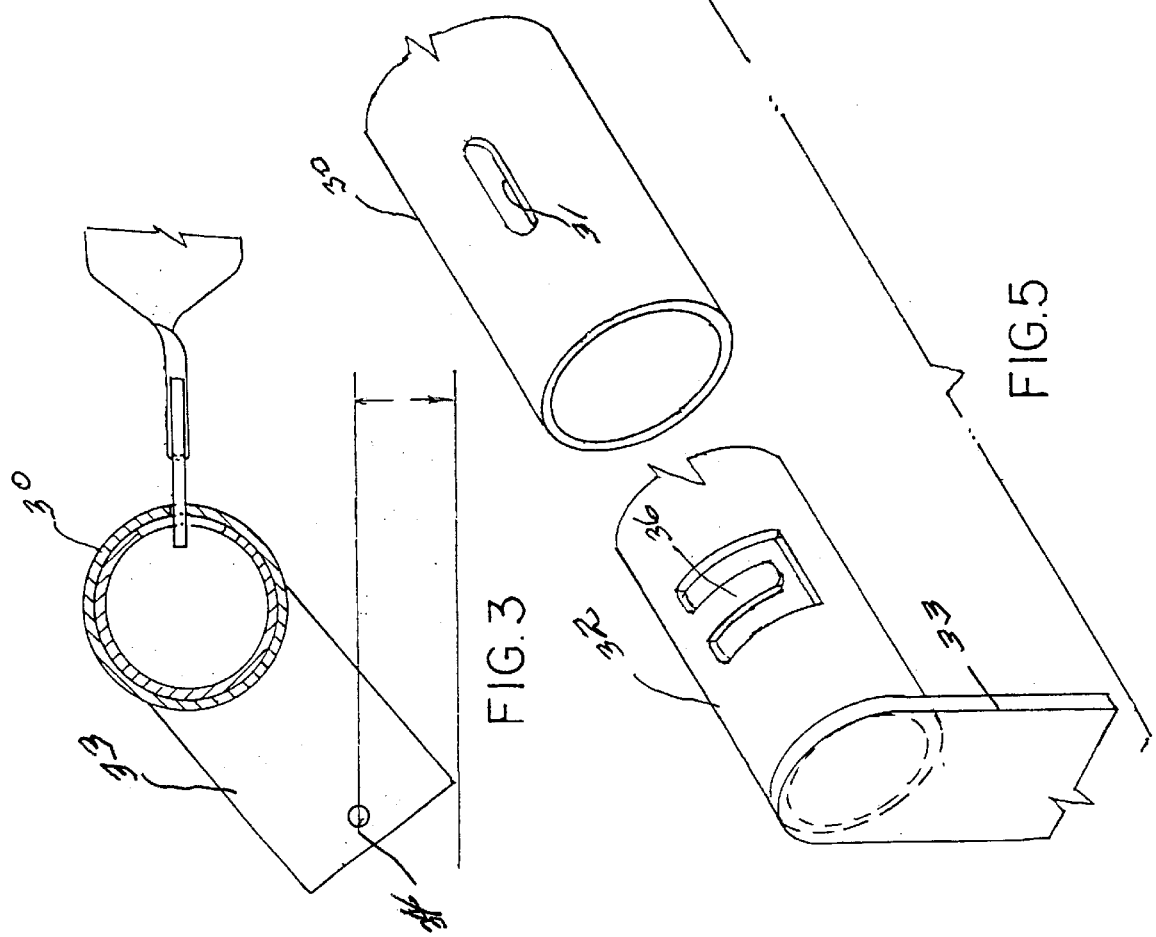
FIG. 3
FIG. 5

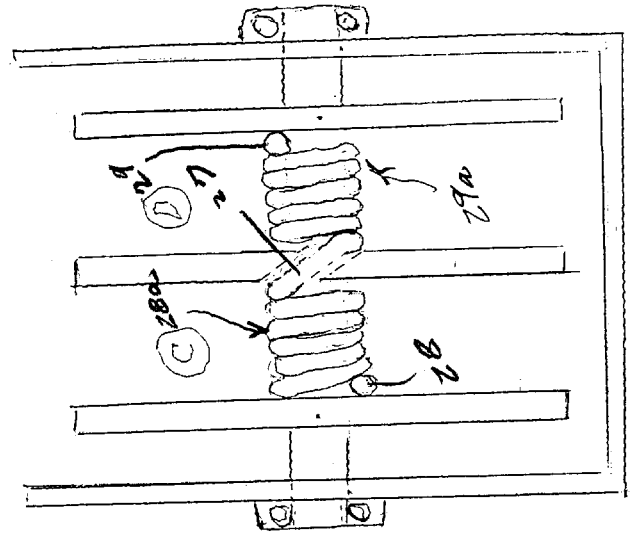
Fig. 11
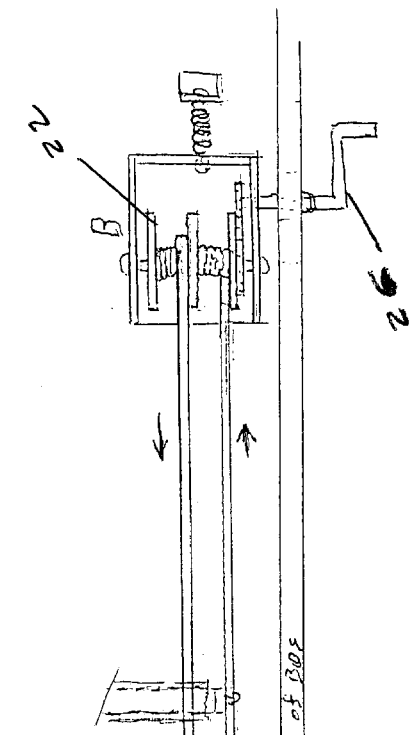
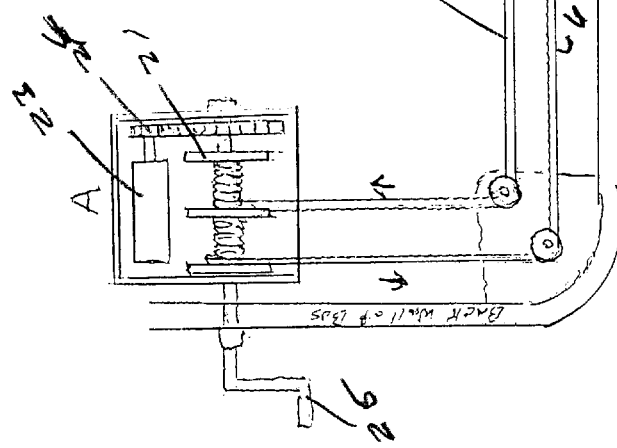
Fig. 10

SEAT BELT RELEASE MECHANISM

CROSS-REFERENCE TO RELATED APPLICATION

This application is a non-provisional patent application based upon provisional patent application having Ser. No. 60/172,645, filed on Dec. 26, 1999, which is owned by the same inventor.

STATEMENT REGARDING FEDERALLY SPONSORED RESEARCH OR DEVELOPMENT.

N/A

BACKGROUND OF THE INVENTION

This invention relates generally to a seat belt release mechanism, primarily for use within the vehicle, and specifically within a vehicle that holds a substantial number of people, such as a school bus, in order to provide for an immediate quick release in the event an emergency situation is encountered, and requires prompt release and removal of the occupants.

There are a variety of seat belt mechanisms for use for holding various occupants securely within a vehicle. Usually, these mechanisms are designed to provide safety through the use of a belt for holding occupants within the vehicle, and give little or no thought to their quick release, in the event that an accident or other emergency condition is encountered.

For example, the patent to Boblitz, U.S. Pat. No. 3,351,381, shows an automatic safety belt device. It is for use in a mass transit type of vehicle, such as an aircraft, cars, buses, and the like. The safety belt device incorporates switch means, at the back end of the various belts, for detecting when the belt is too loosely fitting around its occupant, or if the belt has not properly been fastened. Thus, this device is more concerned, as previously explained, with assuring that the belt is fastened, whenever used, such as in a multiple passenger situation, or if the belt has been too loosely fastened, and needs to be properly adjusted to make it work effectively. Apparently, a lever arm is included within its housing, and can detect when the belt is too loose, and operates a switch for indicating that the belt needs tightening, in its attachment about the passenger. It appears, that this system relates more to the individual detection with respect to a seat belt being too loose, in its connection and attachment, and provides for an indication as to when that situation prevails, and needs correction.

The patent to Garboli, et al, U.S. Pat. No. 5,165,498, discloses an electromechanical device which is tripped by a trigger box for both automatic and manual quick release for motorcars safety belts. This particular device, as described, is to provide a quick release type of mechanism, that may be both automatic, or manual, for use in disconnecting safety belts. The device essentially operates either upon an electromechanical type device, for releasing seat belts, or utilizes a rack bar style of connecting device, for interlocking the seat belts in place. An electronic connection system, operating from batteries, is also disclosed for use for providing a quick release for the coupling buckle that hold the seat belts fastened about the passenger. The current invention is quite distinct from what is described in this patent, since this patent describes a particular style of latch mechanism, trigger box, operated by means of electrical impulse, that energizes the trigger box and provides for a disconnect of the release means, when accuated.

The patent to Ambrosi, U.S. Pat. No. 5,765,660, shows another automatic apparatus for releasing safety belts of motor vehicles or the like, in case of an emergency. It incorporates a series of sensors, that are able to recognize specific situations of danger, and intervene by releasing automatically the opening device of the safety belt. This is not the structure of the current invention, since the current invention does not release any safety belt at their source of connection, nor is there any type of sensor means employed with the current invention that provides for automatically releasing the belts, in the event of a predicament.

These are examples of prior art type of devices, available in the art, or at least published in patents, and upon which the current invention significantly improves, in providing for an automatic seat belt release mechanism, which may be employed in mass occupant vehicles, such as school buses, and the like, to provide for a quick release, allowing for prompt removal of any passengers, in the event of an accident.

SUMMARY OF THE INVENTION

This invention relates primarily to a seat belt release mechanism, designed to provide for a quick release of all of the occupants of a vehicle, for safety purposes, to accelerate evacuation in the event of an accident.

Essentially, this invention relates to a seat belt release mechanism that may be used, for example, upon a school bus, that attaches approximate each seat, as mounted within the bus, to allow for a quick release of its various occupants, such as students. In the event an accident occurs. Or, this device may be used upon any of a variety of vehicles, whether it be an airplane, public service bus, or even a standard automobile, that requires a quick release of its seat belts, in the event of an accident. For example, frequently, when an accident occurs, the occupants are locked into their seats by seat belts, and if a fire commences, the occupants may be burned, even to the point of death. The purpose of this invention is to provide for a quick release, to allow them to remove themselves from the dangerous situation, or to allow the emergency personnel to achieve extraction, of the occupants, in the event of an accident.

In this invention, and as shown in this application, the bus seats include the usual seat portions, and backs, as noted. At the lower back juncture of the seat, and its back, there is included a sleeve, which sleeve is fixed in place. The sleeve has a slot provided herein, and each seat belt, at one end, includes a form of connecting device, such as a D-ring, which extends through the slot of the sleeve. Inside the sleeve is another tube. This inner sleeve also extends the full length of the tube, but further extends out of at least one of its ends. While the sleeve is fixed in place, the tube apparently can rotate, so that when the D-ring of the belt is fixed in place, the tube will have been pivoted downwardly, and its tab passes through the back portion of the D-ring, to lock the seat belt, at their back end, to this holding device, while the seat belts are being routinely used.

But, in the event of an accident, and while the seat belts may hold all these students in place, there is need to provide for an emergency and quick release, to allow the students to get out of the bus, in the event of an accident, which may generate a fire, as previously explained. At this time, the driver of the bus can either push an electronic button, such as to actuate a motor, which pulls a cable or rod, that pulls a pivot arm forwardly, associated with each of the foregoing tubes, and which allows the tubes to pivot counterclockwise, allowing its tabs to provide for an immediate release from the back ends of the D-rings, and to allow all of the seat belts to release simultaneously, and immediately, in addition to collectively. Or, the device may include a mechanical cranking device, that pulls the cable or rod forwardly, and pivots the tube, to release the seat belts, in the event that the electrical systems of the vehicle may have been destroyed, because of the accident. It may be upon further review of this invention that it may be the sleeve that does the pivoting, rather than the tube, but nevertheless, the two cooperate to provide for either a hold, or release, of the D-rings, at the back end of the seat belts, and which allows at least one end of the seat belts to be immediately released, and thereby uncoupling the seat belt from around its occupant.

It is, therefore, the principle object of this invention to provide for a seat belt release mechanism, that may be used in mass transit, to allow for an immediate release of the seat belts, in the event that an accident is encountered.

It is another object of this invention to provide for a quick release for seat belts that may be either electrically, or mechanically, actuated, to provide for disconnection of the seat belts.

Still another object of this invention is to provide for a point source operating mechanism which when actuated, such as electrically, or mechanically, immediately mechanically releases all of the seat belts holding their occupants in position within their seats as within the vehicle.

Still another object of this invention is to provide for a quick seat belt release mechanism that may be used within mass transit vehicles, such as buses, airplanes, boats, or even used in isolated situations, as within the standard vehicle, van, or sports utility vehicle.

Still another object of this invention is to provide for a release mechanism for seat belts which may be electrically or mechanically actuated.

Still another object of this invention is to provide for a mechanical crank mechanism that may be actuated by the driver or emergency personnel that will immediately release all the occupants of a vehicle from their constraining and restraining seat belts, in the event of an accident.

These and other objects may become more apparent to those skilled in the art upon reviewing the subject matter of this invention, as set forth in the summary, and further upon undertaking a study of the description of its preferred embodiment, in view of the drawings.

BRIEF DESCRIPTION OF THE DRAWINGS

In referring to the drawings,

FIG. 1A is a plan view thereof;

FIG. 2 is a more direct perspective view of the quick release seat belt mechanism of this invention, and how it is operatively connected and associated with at least two seats;

FIG. 3 shows a sectional end view of the D-ring of a seat belt secured by its combination tube and sleeve connecting means to the seat of a vehicle;

FIG. 4 shows the D-ring of a seat belt when released, through pivot of the tube within its sleeve;

FIG. 5 shows, an exploded view, the inner tube, with its integral tab, that is designed for bypassing the slot within the outer sleeve, and holding the D-ring of a safety belt in place;

FIG. 6 shows the D-ring at the back end of the seat belt;

FIG. 10 provides a plan view of a hand powered winch showing the relationship between the outgoing and ingoing cables, wrapped around their respective winches, during operation; and FIG. 11 is a plan view of the crossover between the cable having dual wrapping wheels.

DESCRIPTION OF THE PREFERRED EMBODIMENT

Figure 1:
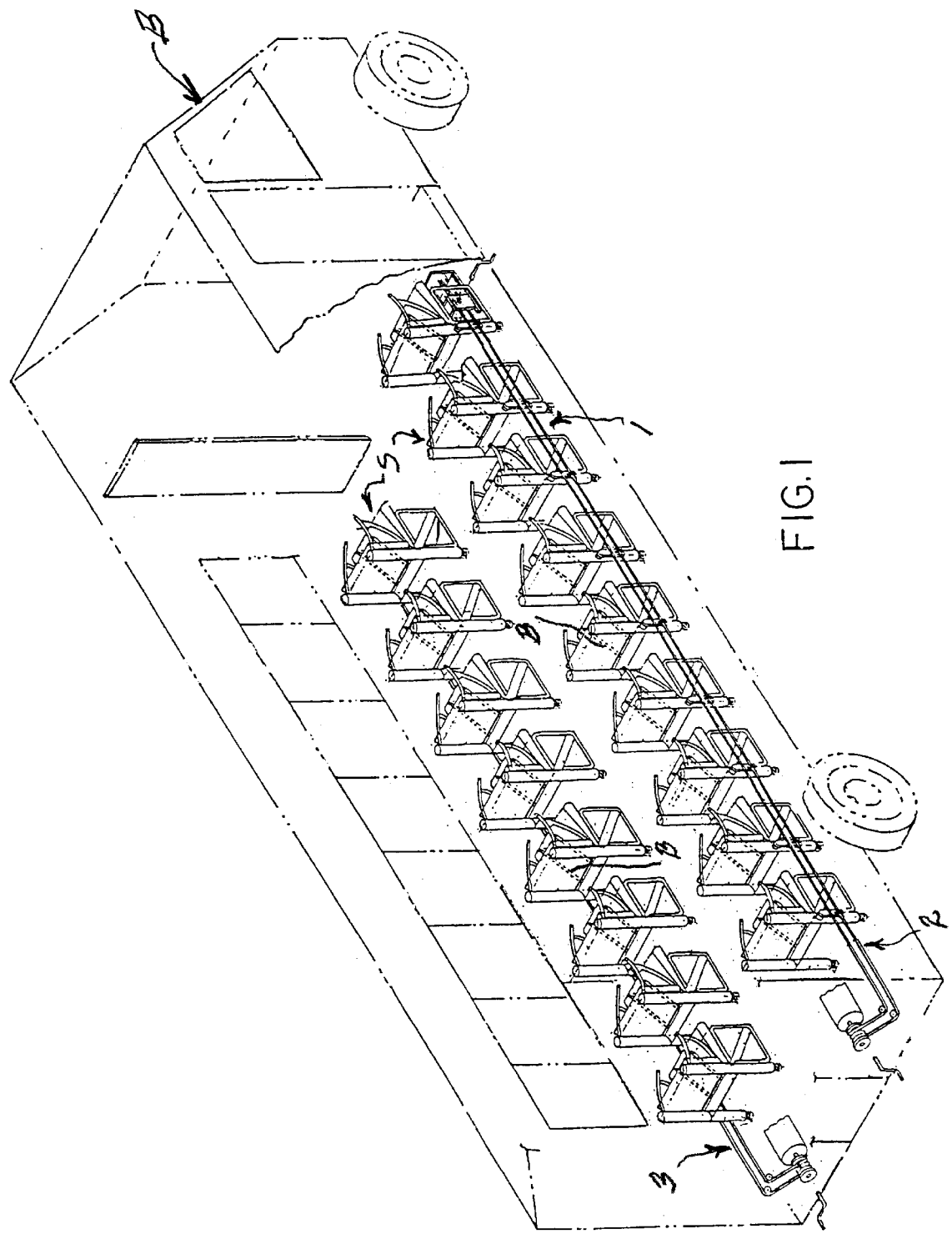
FIG. 1 shows a school bus with its contained seats, and showing the quick release mechanism of this invention.

In referring to the drawings, and in particular FIG. 1, therein is shown a vehicle, such as a school bus B, and in which the cable release mechanism 1 of this invention is installed. As can be noted, the vehicle, such as a school bus, includes a series of aligned seats S, as can be noted. Each of the seats has its respective seat belt B secured therein, and which are provided for retention of any child, or other person, seated upon the bus, into a safety position, during transit. The cable mechanism is provided to either side of the bus, as at 2 and 3, and accommodates its cooperation with seat belts upon both rows of seats, to both the right hand and left hand side of the bus, for facilitating the quick release of the belts, when necessary, as previously described. See also FIG. 1A. As can be noted in FIG. 2, the cable mechanism includes a continuous cable 4, wherein the upper run of the cable 5 moves rearwardly with respect to the longitudinal length of the bus, and the cable run 6 shifts forwardly, during manipulation of the cable release mechanism. This is the direction of movement of the relative strands of cable, particularly when the release mechanism is being operated, to provide a quick release, of the retention of the seat belt around the passenger. On the other hand, when the mechanism is designed for reconnecting the seat belts in place, the upper strand of cable 5 will shift in a forward direction, while the lower strand of cable 6 will move in a rearward direction, to provide for reengagement.

As can also be noted in FIG. 2, there is a crank mechanism 7 associated with the front of cable connecting means 8, and includes a winch therein, as at 9, and around which the ends of the cable are turned, to provide for mounting of the front end of said cable. As can also be noted, adjustment means 10 is provided therein in order to provide for tightening of the cable, into a reasonably snug condition, to furnish its operative positioning. Furthermore, springs 11 are furnished in the front portion of the housing 12, and further provide tensioning upon the cable 4, as it is installed for usage.

Obviously, a manual turning of the winch crank 7 allows for shifting of the cable 4, at its various runs 5 and 6, to provide for a manual either release or reconnecting of the connected seat belts, during functioning of this apparatus. The rear end of the cable, as at 13, wraps around a reel of winch 14, as can be noted. This reel, of the winch 14, may be connected with an electric motor 15 that may automatically power the operations of the winch, or a further winch crank 16 may insert within the socket 17, of the winch 14, and be manually operated, as can be understood, as previously described with respect to the crank 7. Obviously, these crank handles may extend exteriorly of the vehicle, and allow the emergency worker to insert the crank, or simply rotate the same in position, to provide for a quick manual release of the various seat belts, as necessary.

Figure 7:
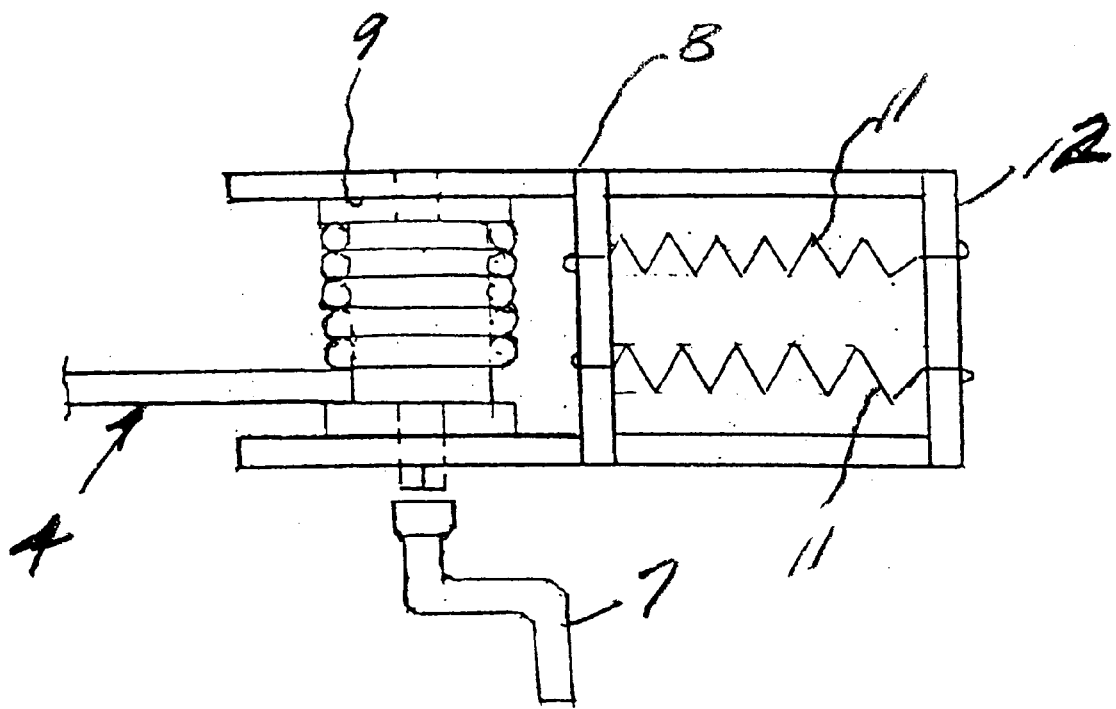
FIG. 7 shows the mechanical cranking means for pulling a cable for providing quick release to the seat belt release mechanism of this invention.
Figure 8:
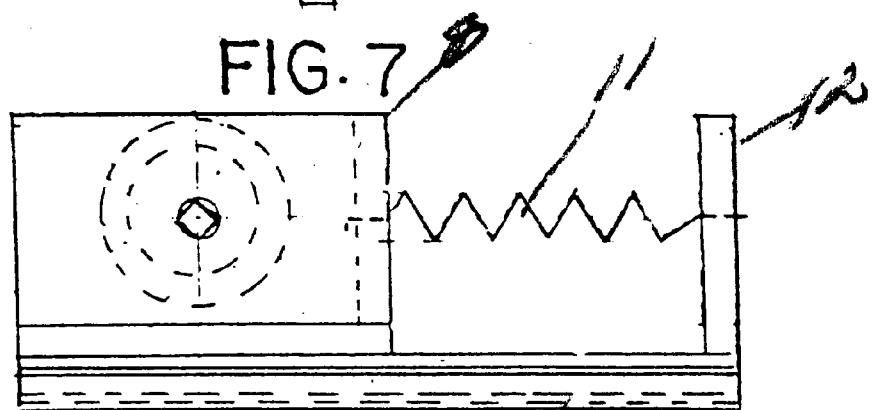
FIG. 8 shows the spring biasing means for holding the winch of FIG. 7 reasonably taut during its installation.
Figure 9:
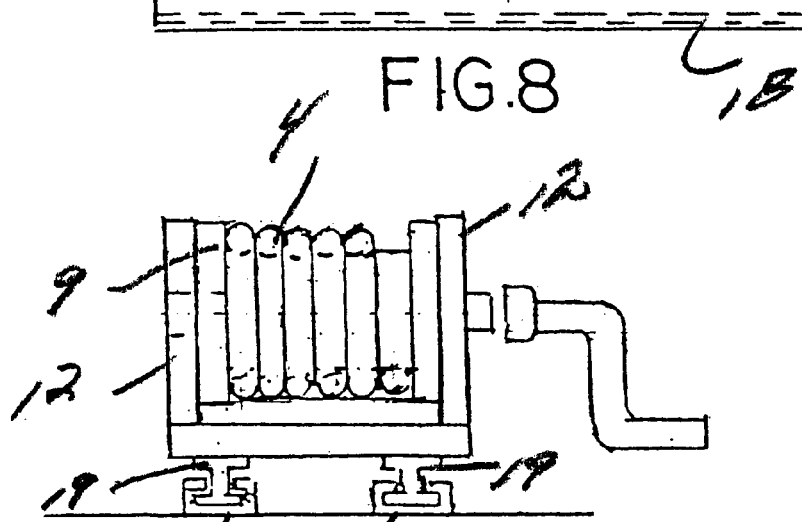
FIG. 9 is a back view of the quick release winch means of this invention.

The specific structure of the winch 8 can be seen in FIGS. 7 through 9, and further discloses how its housing 12 connects therein the various springs 11, which draws upon the structure holding the winch 9 in position, in order to provide tensioning, and maintain the cable 4 taut, when installed. The housing 8 is mounted for sliding within the lower frame work 18 of the housing 12, so that it may be pulled forwardly, by means of the springs 11, to maintain the tightness of the installed cable. The actual slide mounting of the housing 12 can be more accurately seen in FIG. 9, wherein a pair of rails 19 locate within the slides 20 in order to secure the housing 12, holding the winch, into a slidable disposition. as can be understood.

A further means to assure the proper locating of the cable in place can be seen in FIGS. 10 and 11. It is a compound winch 21, as at the back of the vehicle, a similar compound winch 22, as at the front of the cable 4, which hold the continuous cable segments 5 and 6 in position. An electric motor 23 connects through gearing 24 to provide for an automatic drive of the cable, either during interconnecting of the seat belts in place, or to provide for their release. The usual crank handles 25 and 26 are noted, for providing manual manipulation of the release mechanism. Thus, in order to provide equibalance to the cable, as it is manipulated and moved, the crossover, as at 27, of the singular cable provides for a feed out of the cable, as at 28, from the bottom of the compound winch, while the upper part of the cable 29, which is wrapped onto the winch, is balanced both at the top and bottom of the winch reel, as can be noted, during its functioning. Thus, while the cable segment may be wrapped upon the winch during its turning in one direction, as in compartment 28a, it may be unwrapped or moved off of the winch reel as in compartment 29a, as can be noted, for balancing purposes.

The specific means for connecting the seal belt in place, or to provide for its quick release, can be seen in FIGS. 3 through 6. As herein disclosed, an outer sleeve 30 will be stationarily mounted to the back of the frame work of the vehicle seat. It extends approximately the width of the shown seats. The sleeve 30 has at least a pair of slots 31 provided therethrough. Contained within the sleeve 30 is a mounting tube 32, and the mounting tube is located within said sleeve, but extends out their outer ends thereof, in order to provide for rigid connection thereto of the levers 33, one of each connects to each of the tubes 32, at the sides of the shown tubes. The levers 33 include means, such as any type of fastening means, as at 34, for accommodating a fastener or other connecting device thereto, and which may clamp onto the cable segment 6, as can be noted in FIG. 2. The clamping mechanisms are shown in FIG. 2 at 35. When each tube 32 is located within its respective sleeve 30, the integral tabs 36 of each tube locates adjacently interiorly thereof, but aligned therewith, the slots 31 of the shown sleeves 30. Thus, when the lever 33 is pivoted downwardly, the tube 32 will rotate in a counter clockwise direction, causing its integral tabs 36 to shift upwardly, and clearing the slot 31 of each of its respective sleeve 30. At that time, the end of the seat belt B, which has connected thereto a D or other shaped ring 37, may insert through the respective slot 31, and extend interiorly sufficiently, as can be seen at 38 in FIG. 4, so that when the levers 33 are pivoted by means of the connecting cable in a clockwise direction, the tabs 36 pivot downwardly, pass through their respective and associated D-ring 38, to lock the D-ring within the sleeve 30. When in this position, the seat belt will be firmly fastened in place, and can be clamped about the occupant, or both of them, of the vehicle seat, for standard usage of the seat belt in a manner that provides for the safety of the retained occupants. But, when an emergency condition prevails, such as an accident, or other disaster, requiring the seat belts to be immediately released, for quick evacuation of the vehicle occupants, either the winch handles 7 or 16 may be rotated, to pull the levers 33 in a counter clockwise direction, thereby rotating the associated tubes 32 likewise in a counter clockwise direction, for pivoting the tubes and their integral sleeves 36 upwardly, thereby releasing the D-rings from their connection within their respective sleeve 30. Thus, the seat belts are immediately freed, without requiring an opening of their respective clamps, and the occupants of the vehicle or bus may be removed, as required.

To simply reengage the seat belts, for normal functional usage, the D-rings 38 of each seat belt B may be simply slid within their aligned and respective slots 31, the cable 4 may be turned either by the winch handles 7 or 16, or the various motors 15 and 23, to pull the cable in an opposite direction, thereby shifting the lower cable strands 6 rearwardly, pivoting the tube 32 in a clockwise direction, allowing their integral tabs 36 to become positioned within the D-rings 37, and to secure the back end of the seat belts in place, for further routine usage and application.

Obviously, other configurations or shapes to the tabs 36 formed of their respective tubes 32, and aligned with some type of a slot, as 31, may be considered by those skilled in the art as a means for engaging the back end of the seat belts, into their locked conditions, and to provide routine application of the seat belts, in a normal manner, for holding the occupants of the vehicle seats S, in position, during routine transit.

Other variations may include the use of a length of rod, rather than the cable 4, that may pivotally secure by any pivotal connection means to the various levers 33, and also function as a means to provide for a shifting rearwardly or forwardly of the levers 33, and a pivot of their associated tube means 32, to provide for that functionality, in the movement of the tubes 32, relative to their sleeves 30, and provide some type of means for locking the belt rings 37 in place, when inserted within their respective sleeve slots 31, as during routine usage.

It is just as likely that a single strand of cable may likewise be extended between a pair of winches, such as the single strand of cable 6, which may connect with each of their respective levers 33, so that when the cable is wound in one direction, it will provide for inner connection of the seat belts with each of their respective sleeve-tube combinations, and when wound in an opposite direction, provides for a pull of the cable in the opposite direction, affording a prompt release of the back end of each seat belt.

Variations or modifications to the subject matter of this invention may occur to those skilled in the art upon reviewing the invention as described herein. Such variations or modifications, if within the spirit of this development, are intended to be encompassed within the scope of the invention as described. The description of the preferred embodiment, as made herein, and as shown in the drawings, is furnished for illustrative purposes only.

Having thus described the invention what is claimed and desired to be secured by Letters Patent is:

1. A seat belt release mechanism for use in conjunction with a vehicle having a series of seats and adapted for conveying a plurality of occupants, each seat in the vehicle having an individual seat belt for each occupant, with the release mechanism herein capable of providing immediate release of all of the occupants from containment by the seat belt in the event of an accident; said release mechanism including concentric sleeves, one of said sleeves being an outer sleeve, and the second sleeve being an inner concentric sleeve, the outer sleeve having at least one slot provided therethrough, the inner sleeve having at least one integral tab, which is exposed through the slot of the outer sleeve; each seat belt, at one end, having a ring, said ring disposed for inserting through the outer sleeve slot and being contained by the tab of the concentric inner sleeve, when securing the seat belt for usage, and upon pivot of the inner sleeve, releasing the seat belt ring and opening of the seat belt to allow for prompt removal of the seat belt and simultaneous release of all of the occupants from seat belt containment; and a cable operatively associated with each of the inner sleeves to provide for their pivot, when the cable is pulled in one direction, for locking all of the seat belts in place; and upon movement of the cable in the opposite direction, providing for inner sleeve pivot and its release of the seat belt rings to allow for prompt release of all of the seat belts and simultaneous freeing of all of the vehicle occupants.

2. The release mechanism of claim 1 including framework supporting each vehicle seat, and the outer sleeve associated with each seat being fixed to said framework.

3. The release mechanism of claim 2 and including each inner sleeve at one end having a lever connected thereto, and the lever connecting with the cable to provide for pivot of the inner sleeve relative to its outer sleeve and for securing or releasing the seat belt from its occupant.

4. The release mechanism of claim 3 and including said cable having ends, and a crank mechanism operatively associated with one end of the cable to provide for its movement in either direction to furnish an immediate containment or release of the seat belt from the vehicle occupant.

5. The release mechanism of claim 3 including said cable having ends, and a winch mechanism operatively associated with one end of the cable, and when actuated, providing for movement of the cable and a containment or release of the vehicle occupant from the seat belt.

6. The release mechanism of claim 5 and wherein said winch mechanism is electrically operated.

7. The release mechanism of claim 5 and wherein said crank mechanism is located externally of the vehicle.

8. The release mechanism of claim 2 and wherein each seat having an outside edge, and the cable and release mechanism being operatively associated with the outside edges of each seat along the length of the vehicle.

9. The release mechanism of claim 8 and wherein said vehicle comprises a bus.

10. The release mechanism of claim 9 wherein said vehicle comprises a school bus.

11. A release mechanism for securing or disconnecting the end of a seat belt from around an occupant; including a first sleeve means affixed to the seat, a second sleeve means maintained internally of the first sleeve means, said second sleeve means disposed for shifting in cooperation with one end of the seat belt for securing it about the occupant, said first sleeve means having a slot therethrough, said second sleeve means having a tab provided thereon and disposed for engagement of one end of the seat belt extending through the first sleeve means slot, when said second sleeve means is pivoted in one direction, and when said second sleeve means is pivoted in an opposite direction, releasing the end of the seat belt and releasing the securement of the seat belt from around its occupant; and means operatively associated with the second sleeve means to provide for its actuation in one direction for securement of the seat belt, and for providing for its actuation in an opposite direction for release of the seat belt from around any occupant.

12. The release mechanism of claim 11 wherein said release mechanism operatively associated with each seat of the vehicle to provide for simultaneous release of the seat belt from around each seat occupant in the event of an emergency.

* * * * *